Oct. 12, 1965  L. V. WHISTLER, SR., ETAL  3,211,035
PUNCH STRIPPER APPARATUS
Filed Aug. 20, 1963  4 Sheets-Sheet 1
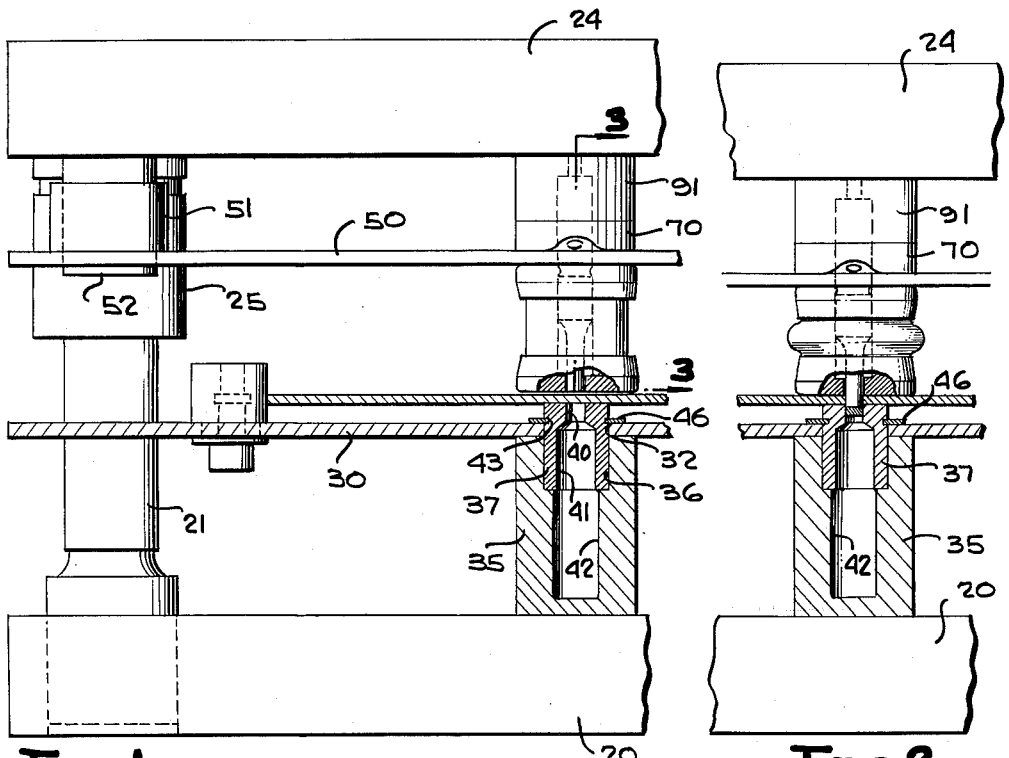
INVENTORS
LAWRENCE V. WHISTLER, SR
& LAWRENCE V. WHISTLER, JR.
BY *Shoemaker and Mattare*
ATTORNEYS

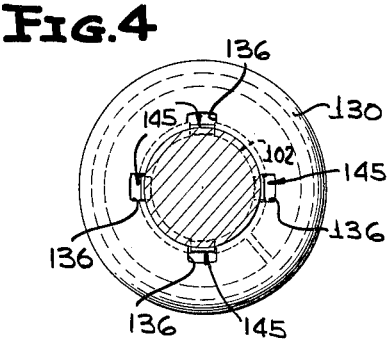
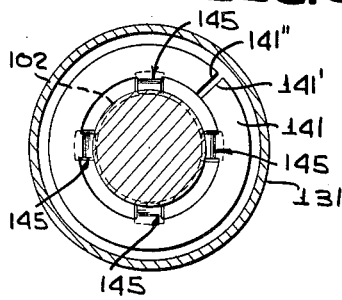
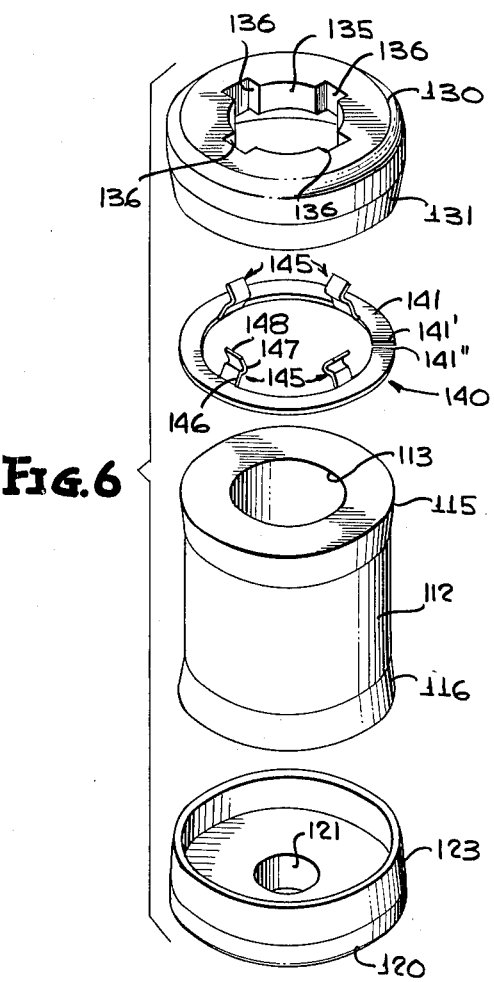
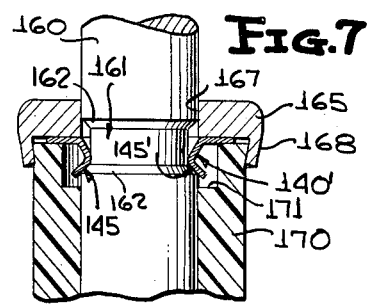
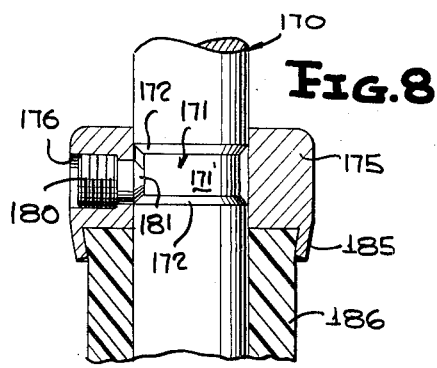

Oct. 12, 1965     L. V. WHISTLER, SR., ETAL     3,211,035
PUNCH STRIPPER APPARATUS
Filed Aug. 20, 1963                       4 Sheets-Sheet 3
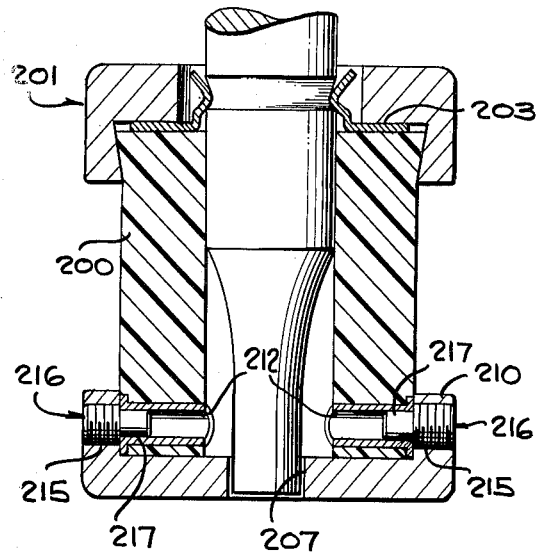
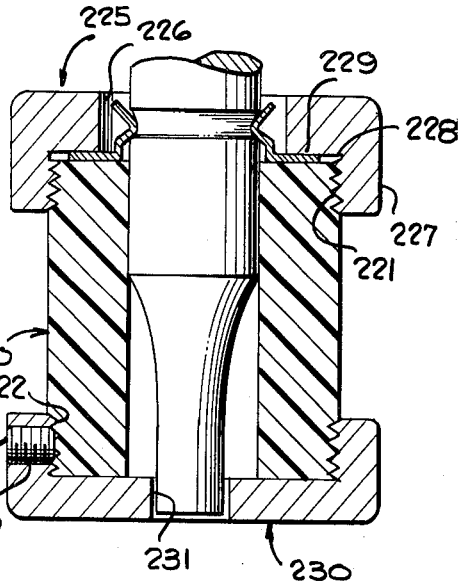
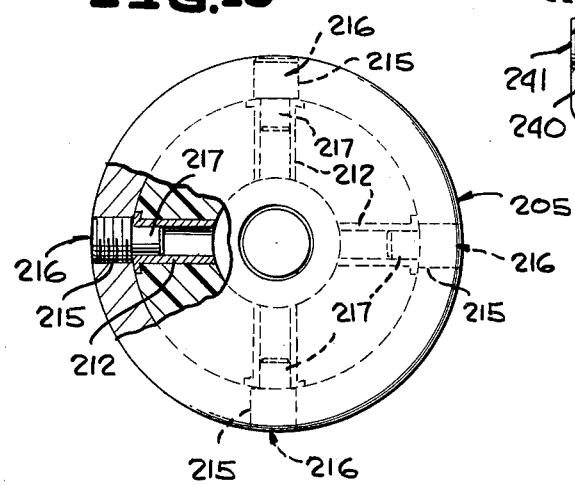
INVENTORS
LAWRENCE V. WHISTLER SR.
& LAWRENCE V. WHISTLER, JR.
BY *Shoemaker and Mattare*
ATTORNEYS

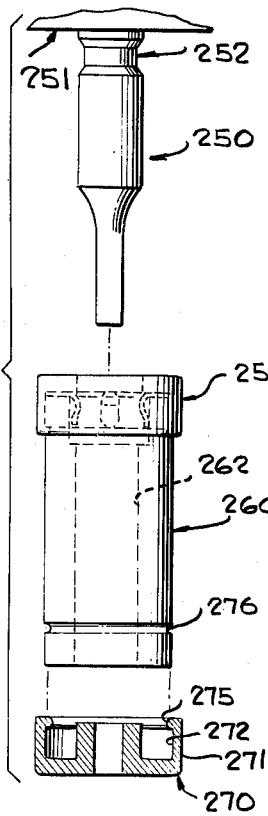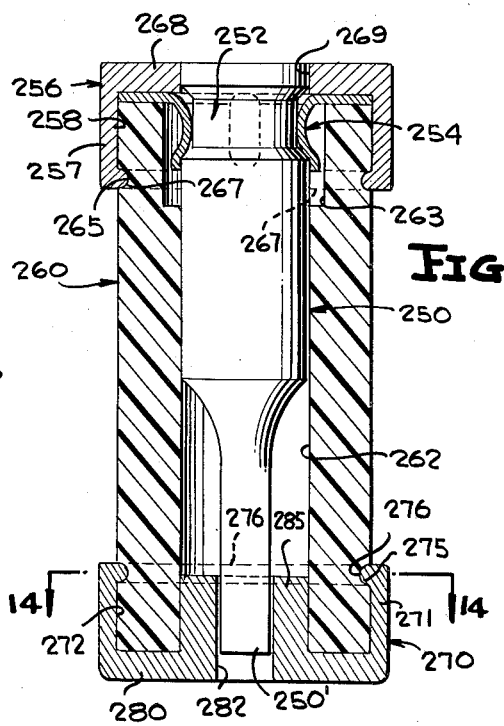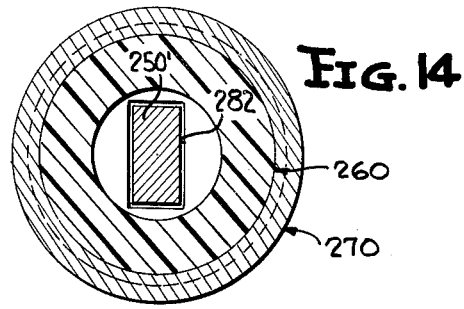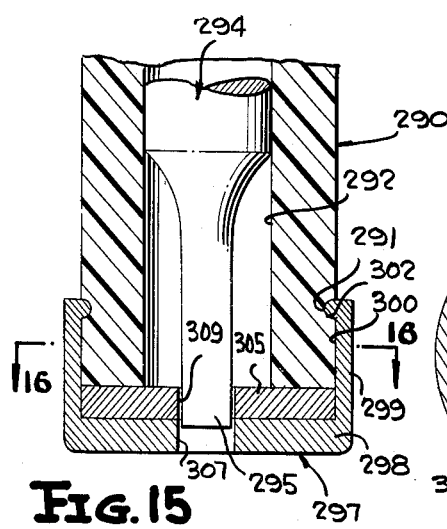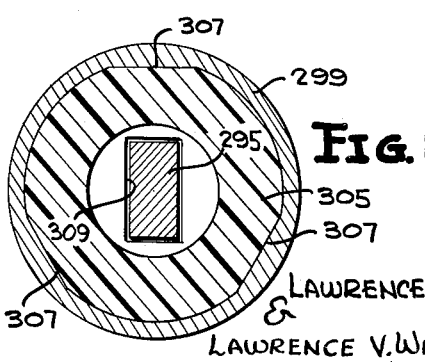

United States Patent Office 3,211,035
Patented Oct. 12, 1965

3,211,035
PUNCH STRIPPER APPARATUS
Lawrence V. Whistler, Sr., 259 Doncaster Road, and Lawrence V. Whistler, Jr., 251 Doncaster Road, both of Kenmore 17, N.Y.
Filed Aug. 20, 1963, Ser. No. 303,730
25 Claims. (Cl. 83—139)

The present application is a continuation-in-part of co-pending U.S. patent application Ser. No. 273,748, filed Apr. 17, 1963, and now abandoned.

The present invention relates to new and novel punch stripper apparatus and more particularly to a stripper device incorporating a body means formed of elastic material which is adapted to be mounted in operative position in surrounding relationship to a punch and the like.

The stripper arrangement of the present invention is so constructed and arranged as to be utilized with punches as used in piercing, perforating, notching operations, and the like wherein the stripper strips off the workpiece in a well-known manner.

In the past, such stripper devices have ordinarily employed metallic springs, the best of which are made of silicone wire shot peened. Even the best of these prior art devices of this type have not held up well under use since springs of this type often fail after two or three thousand compressions of the appratus. It is accordingly an important feature of the present invention to provide an arrangement which considerably lengthens the life of the stripper apparatus, and for this purpose, a unique body means is employed formed of an elastic material of such a nature as to provide the desired resilient characteristics and which is sufficiently hard and durable to withstand numerous compressions without failure.

Various elastic materials of the desired characteristics may be employed, and preferably, the body means is formed of a polyurethane plastic material such as the product identified as "Duthane," manufactured by the Dunlop Manufacturing Co., this substance having rubber-like resilience and a hardness far beyond rubber. When utilizing a stripper device incorporating a body means formed of polyurethane plastic material, it has been found that the stripper device will provide satisfactory service even after having been flexed 200,000 times, thereby representing an oustanding improvement over the metallic spring type arrangements and providing a performance which has been impossible with prior art spring arrangements of comparable size to the device of the present invention.

A further important feature of the present invention is the manner in which the stripper is attached to an associated punch. In order to facilitate attachment of the stripper, means is provided on the stripper device for quickly and easily attaching the stripper in operative position relative to the punch and for securely retaining it in such operative position.

In a preferred form of the invention, the means for retaining the stripper apparatus in position on a punch takes the form of a resilient spring means including inwardly extending portions which are adapted to engage a groove portion provided in a punch whereby the stripper apparatus can be mounted in operative position simply by pushing it on the punch wherein it will snap into operative position and be retained in such operative position until it is selectively removed by manually pulling it off of the punch.

A pair of relatively hard end portions are fixed to the opposite ends of the elastic body means of the stripper apparatus, and various means may be employed for securing these end portions in operative position. In one form of the invention, the end portions include recesses with tapered inner surfaces which engage correspondingly tapered surfaces formed on the body means for assisting and retaining the members in operative position. In a second form of the invention, the hard end portions are provided with peripheral inwardly extending lips which are received in circumferentially extending grooves provided in the outer surface of the body means. In each modification of the apparatus, the mechanical interconnection between the end portions and the body means may be supplemented by the utilization of a suitable adhesive substance for ensuring that the end portions are not accidentally detached from the body means.

A further problem arises in connection with the hard end portion employed at the lower end of the body means when the punch with which the stripper apparatus is employed has a working end portion which is non-circular. This problem arises primarily due to the fact that the working end portion or part of the punch may be periodically sharpened thereby shortening this end of the punch. Under such circumstances, there is the danger that the end of the punch may pass upwardly with respect to the hard end portion and leave the central opening therein which would permit the stripper apparatus to be moved concentrically about the punch whereby the non-circular punch would be out of alignment with the correspondingly shaped opening formed through the central portion of the lower end portion secured to the body means. Since there is a relatively small clearance between the opening in the lower end portion on the body means and the working end of the punch, such misalignment would cause the punch to engage the lower hard end portion on the body means and cause serious damage to the punch. Accordingly, two modifications of the invention disclose means whereby the central or medial portion of the lower end portion fixed to the body means is provided with an additional thickness so as to ensure that the punch will not leave the opening of the end portion whereby the stripper apparatus cannot rotate such that the opening would be out of alignment with the end of the punch, thereby ensuring proper alignment at all times.

The stripper apparatus of the present invention is particularly designed to provide a very compact and simple construction, and yet at the same time the arrangement is designed so as to be quite sturdy and longlived and very effective in performing its intended stripping function.

An object of the present invention is to provide new and novel punch stripper apparatus for stripping off work from punches utilized for example in piercing, perforating, and notching operations and the like.

Another object of the invention is the provision of punch stripper apparatus incorporating means for quickly and easily mounting the stripper device on a punch and for securely retaining it in operative position.

A further object of the invention is to provide punch stripper apparatus incorporating a novel body means which substantially increases the useful life expectancy of the apparatus.

A still further object of the invention is the provision of punch stripper apparatus which is quite simple and compact in construction, and yet which is quite sturdy and effective in use.

Yet another object of the invention is to provide punch stripper apparatus including an elastic body means and a pair of relatively hard end portions secured to opposite ends thereof, wherein novel means is employed for securing the hard end portions in operative position.

Still another object of the invention is the provision of punch stripper apparatus for use with punches having a working end of non-circular cross-sectional configuration and including means for preventing misalignment of the punch and the stripper apparatus to thereby prevent damage to the working end of the punch.

Other objects and many attendant advantages of the invention will become more apparent when considered in connection with the specification and accompanying drawings, wherein:

FIG. 1 is an elevation partly in section of a punch and die assembly incorporating the novel punch stripper apparatus of the present invention;

FIG. 2 is an enlarged view of a portion of the structure shown in FIG. 1 illustrating the punch stripper device in its compressed condition;

FIG. 3 is a still further enlarged longitudinal section through the punch stripper apparatus of the present invention illustrating the manner in which it is mounted in operative position upon a punch;

FIG. 4 is a sectional view taken substantially along line 4—4 of FIG. 3 looking in the direction of the arrows;

FIG. 5 is a sectional view taken along line 5—5 of FIG. 3 looking in the direction of the arrows;

FIG. 6 is an enlarged exploded perspective view of the stripper apparatus of the present invention;

FIG. 7 is a sectional view through a portion of a modified form of the stripper apparatus;

FIG. 8 is a longitudinal section through a still further modified form of the stripper apparatus;

FIG. 9 is a longitudinal sectional view of a still further modified form of the stripper apparatus;

FIG. 10 is a bottom view of the structure shown in FIG. 9;

FIG. 11 is a longitudinal sectional view through a still further modified form of the stripper apparatus;

FIG. 12 is an exploded view partially in section illustrating a still further modified form of the invention;

FIG. 13 is a longitudinal sectional view through the apparatus shown in FIG. 12 in its assembled relationship;

FIG. 14 is a sectional view taken substantially along line 14—14 of FIG. 13 looking in the direction of the arrows;

FIG. 15 is a sectional view through a further modified form of the invention; and FIG. 16 is a sectional view taken substantially along line 16—16 of FIG. 15 looking in the direction of the arrows.

Referring now to the drawings wherein like reference characters designate corresponding parts throughout the several views, there is shown in FIG. 1 a punch and die assembly including a die shoe 20 which supports a vertically upwardly extending guide post 21. A punch shoe 24 spaced vertically above the die shoe is provided with a downwardly extending guide post bushing 25 having a longitudinally extending opening therein which snugly receives guide post 21 for properly guiding the punch shoe in its movement relative to the die shoe during operation of the apparatus as will be well understood by one skilled in the art.

A die template 30 is suppported in operative position by a plurality of die template support posts (not shown) extending upwardly from the die shoe. The die template is provided with an opening 32 for positioning the die holder in proper operative position. The die holder includes a body 35 having a central socket or opening 36 in the upper portion thereof which receives a die bushing 37. The die bushing is provided with a central opening 40 in the upper surface thereof which is in communication with the opening 41 in the lower portion of the die bushing which in turn is in communication with an opening 42 within body 35, opening 42 opening through the side of the die holder for allowing slugs from the workpiece to pass downwardly and outwardly of the die holder in a well-known manner.

The die bushing is provided with a circumferentially extending groove 45 which receives a snap ring 46 therein. The purpose of the snap ring in cooperation with the die bushing is to maintain the die bushing which is in turn connected as by a set screw or the like with the body 35 in position in the die template when assembling the apparatus such that the die bushing and die holder may be attached to the template at a remote position and then assembled in operative position as shown.

A punch template 50 is supported from a template support post 51, the template being held in operative position by a template clamp screw 52. As seen particularly in FIG. 3, template 50 is provided with an opening 55 for properly positioning the punch holder and punch in alignment with the die holder and die bushing therebeneath.

Referring now to FIG. 3 of the drawings, the punchholder according to the present invention is illustrated and comprises a body portion 70 having a substantially annular collar 71 of reduced diameter formed at one end portion thereof and a groove 72 formed in the outer surface of the opposite end portion thereof. A central opening 75 is formed in the body and opens at the lower surface 76 of the punch holder. Accurate formation of annular collar 71 and opening 75 insures that the punches inserted within opening 75 are concentric with collar 71 and the associated opening in the template. A reduced opening 77 is formed through the central portion of the opposite end portion of the body and is in communication with opening 75. An obliquely extending threaded opening 78 is provided in the side portion of the body means and opens obliquely into opening 75, opening 78 being adapted to receive a set screw 79.

An inner magnetic insulating sleeve 80 is mounted on the inner portion of groove 72 and is formed of a suitable substance such as brass, aluminum or other material which is non-magnetic, whereas the body portion 70 of the punch holder is formed of a good magnetic conductor such as an alloy steel or the like. In order to retain sleeve 80 firmly in position within groove 72, two circumferentially extending depressions 81 and 82 are provided around the upper end portion of the body, sleeve 80 including deformed portions 83 and 84 seated in grooves 81 and 82 respectively. The upper end 85 of inner sleeve 80 is spun or flanged over for a purpose hereinafter described.

A permanent magnet 90 of substantially annular configuration is disposed in surrounding relationship to inner sleeve 80, the magnet being of a relatively powerful permanent type such as a magnet identified as Alnico No. 5. An outer magnetic shielding sleeve 91 is disposed in surrounding relationship to magnet 90 and is substantially flush with the outer surface of body 70. It is evident that magnet 90 is retained in operative position between sleeves 80 and 91.

A core member 92 formed of a suitable magnetically conducted substance such as cold rolled steel is of substantially annular configuration and is disposed between sleeves 80 and 91 and abuts the upper end portion of magnet 90. Core 92 is provided with a circumferentially extending groove 93 formed on the upper inner surface thereof for receiving the turned-over end portion 85 of sleeve 80. It is evident that the aforedescribed structure is such that the turned-over end portion 85 of sleeve 80 retains the core member 92 in abutting relationship with magnet 90, and urges the magnet into tight contact with body portion 70.

As shown in FIG. 3, a punch is illustrated as mounted in operative position within the magnetic punch holder, the punch including a main cylindrical portion 100 which is snugly received within the opening 75 of the punch holder, cylindrical portion 100 having a notch 101 formed in the outer surface thereof for receiving the upper end of set screw 79 for retaining the punch in operative position. The punch is also provided with a circumferentially extending groove 102 in that porttion of the cylindrical portion 100 which is positioned below the lower end of the punch holder, groove 102 serving as a means for mounting the stripper device in operative position. It will be noted that collar portion 71 of the punch holder is positioned with the opening 55 in the punch template for properly positioning the punch holder and its associated punch. I will also be noted as seen in FIG. 3 that the stripper device indicated in its entirety by the reference numeral 110 when mounted in operative position as shown serves to clamp the punch holder along with the punch and the attached stripper device in position on template 50 to enable the punch holder and stripper device to be assembled on the punch template at a remote position and then placed in operative position as shown.

The stripper device 110 includes a body means 112 which is formed of a suitable elastic material such as a polyurethane plastic, this body means being generally annular and having a generally outer cylindrical configuration with a longitudinally extending bore 113 formed therethrough of such a dimension as to slidably receive the cylindrical portion 100 of the punch.

It will be noted that the upper portion 115 and the lower portion 116 of the outer surface of the body means 112 flares outwardly toward the ends of the body means, this construction facilitating the mounting in place of the end members hereinafter described.

A lower end member or end portion 120 is formed of metal or a hard molded material which is substantially harder than the material of the body means 112. Member 120 which may also be termed an end plate is provided with a central opening 121 adapted to receive the lower working end of the punch. Member 120 also includes a peripheral flange portion 123 which extends upwardly or longitudinally of member 120, this flange portion defining a recess in one surface of member 120 for receiving an end portion of the body means 112. It will be noted that the inner surface 125 of the flange portion 123 tapers outwardly and inwardly away from the main portion of member 120 to define a taper complementary to the shape of the lower end of body means 112 whereby the lower end of the body means 112 is snugly received within the recess of member 120 for retaining member 120 in operative position as shown. The flange portion 123 may be mechanically crimped into the position shown for securely attaching member 120 to the body means 112.

A second end member or end portion 130 is mounted at the opposite end of body means 112, end member 130 being formed of a material similar to that of member 120 and including a peripheral flange portion 131 which extends longitudinally thereof to define a recess for receiving the upper end of body means 112. It will be noted that the inner surface 132 of flange portion 131 tapers outwardly and inwardly away from the main portion of end member 130 to define a recess of complementary shape to the upper outer surface of body means 112 for snugly receiving such end portion of the body means. Again, the flange portion 131 may be crimped in position as shown for securely attaching the end member to the body means.

As seen particularly in FIGS. 4 and 6, end member 130 is provided with a central generally circular opening 135. A plurality of substantially radially extending slots 136 are provided in communication with the central opening 135 for a purpose hereinafter described.

As seen particularly in FIG. 6, the means for retaining the stripper device in operative position in surrounding relation to a punch in this form of the invention takes the form of a resilient spring means indicated generally by reference numeral 140 formed of a spring steel or similar material which includes a main flat substantially annular portion 141 defining a split ring having the opposite ends 141' and 141" separated from one another whereby the over-all spring means is adapted to expand and contact to enable the spring means to move into its desired operative position.

Extending inwardly and out of the plane of the flat portion 141 are a plurality of spaced arms indicated generally by reference numeral 145, and being shown as four in number equally spaced from one another. Each of these portions 145 includes an inwardly extending portion 146 which extends at an oblique angle to the flat portion 141, portion 146 joining with a rounded portion 147 adapted to seat within a recess or groove in an associated punch, portion 147 in turn joining with a portion 148 extending outwardly from portion 147. As seen in FIG. 3, the groove 102 formed in the outer surface of the punch is of such a configuration as to snugly receive the rounded portions 147 of the spring retaining means whereby the spring retaining means is adapted to snap into place within the groove in the punch and retain the stripper device in operative position as shown.

It will be noted as seen in FIG. 3 that the flat portion 141 of the retaining means is mounted in an annular space 150 defined between the upper surface of the body means 112 and the under surface of the main portion of end member 130. It will further be noted that the outside diameter of portion 141 is of less diameter than the inside diameter of the adjacent inner surface of the flange 131, thereby allowing free expansion and contraction movement of the spring retaining means in order that it may readily expand over the cylindrical portion 100 of the punch when the stripper means is pushed into operative position and then the arm portions 145 can readily snap into the operative position as illustrated.

It will be readily apparent that the stripper means can be mounted in the operative position shown in FIG. 3 simply by manually pushing the stripper device over the lower end of the punch into the position shown.

Referring now to FIG. 7 of the drawings, a modified form of the invention is illustrated wherein the punch 160 is provided with a novel shaped groove 161 including a flat portion 161' which intersects sloping tapered surfaces 162. In this form of the invention, a spring retaining means 140' which is identical in construction with the spring retaining means 140 previously described is employed, the only difference being that the spring retaining means 140' is employed in an inverted or upside down position as compared to the previously described modification.

An end member 165 is provided similar in construction to the end member 130 previously described, but member 165 is only provided with a central circular opening 167 for receiving the outer surface of the punch, there being no necessity for providing the slots 136 provided in member 130 since the arm portions of the spring retaining means extend downwardly in the modification shown in FIG. 7.

End member 165 is provided with a peripheral flange portion 168 identical with the peripheral flange portion 131 of member 130, flange portion 168 being adapted to receive the upper and outwardly flared end portion of the body means 170 which is substantially identical with the body means 112 previously described.

The only difference between body means 170 and body means 112 is the fact that body means 170 is counterbored as indicated at 171 to provide a clearance for the downwardly extending arm portions 145' of the spring retaining means 140'. It will be apparent that the operation and general concept of the modification shown in FIG. 7 is identical with that of the previously described modification, the stripper device merely being pushed into operative position as shown wherein it will snap into the desired relationship.

Referring now to FIG. 8 of the drawings, a further modified form of the invention is illustrated, wherein a punch 170 is provided with a groove 171 similar to groove 161 and including a flat bottom portion 171' which intersects sloping tapered surfaces 172.

End member 175 is formed of a material similar to end member 130 previously described, and is provided with a radially extending stepped opening 176, the outer portion of which is threaded to receive a cooperating threaded set screw 180. The inner end of set screw 181 is tapered at an angle complementary to the taper of surfaces 172 whereby the set screw is adapted to fit into the operative position as shown in FIG. 8 for retaining the stripper device in operative position.

End member 175 includes a peripheral flange portion 185 which is similar to the flange portions previously described on the end members and which is adapted to snugly receive the upper and outwardly flared end portion of a body means 186 similar to the body means previously described.

Referring now to FIGS. 9, 10 and 11, further modifications of the invention are illustrated wherein the end member or portion mounted at the lower end of the stripper device is detachable and removable from the body means such that different lower end portions or stripper faces may be mounted on the stripper device as desired. It is usually necessary to have the central hole in the lower end portion or stripper face close to the diameter of the punch being used, and accordingly, this lower end portion can be changed to provide other portions having different size central openings depending on the size of the punch with which the device is being utilized.

FIGS. 9 and 10 show one modification including a body means 200 formed of material similar to the previously described body means, the upper end portion of this body means being flared as previously described, while the lower end portion thereof is substantially cylindrical. An end member 201 substantially identical in construction with the end member 130 previously described is mounted at the upper end of the body means 200, and a spring retaining means 203 substantially identical with the retaining means 140 previously described is employed for retaining the entire stripper device in operative position as shown.

A modified form of the lower end member is illustrated and is indicated generally by reference numeral 205. This lower end member includes a central opening 207 for receiving the lower working end of the punch. Member 205 also includes a peripheral flange portion 210 which defines a central recess at one side of end member 205 for receiving the lower end of the body means 200.

A plurality of tubular members 212 formed of a hard material such as metal or the like are embedded within the material at the lower portion of the body means 200, these tubular members extending substantially radially of the body means as illustrated. Flange portion 210 is provided with four equally spaced radially extending openings 215 which are adapted to be aligned with the tubular members 212, openings 215 being threaded to receive the threaded outer portions of set screws 216, the inner portions 217 of the set screws fitting snugly within the hollow interior of the tubular members 212. The interengagement of the inner ends of the set screws within the tubular portions 212 serves to retain the end member 205 in operative position, and it is apparent that it can be readily removed and replaced without disturbing the other elements of the apparatus as desired.

Referring now to FIG. 11 of the drawings, a still further modified form of the invention is illustrated wherein the body means 220 is formed of material similar to the previously described body means and is provided with a longitudinally extending bore therethrough as are each of the various body means of the invention. In this modification of the invention, the body means 220 is illustrated as being substantially cylindrical throughout its length, and is provided with threaded outer portions 221 and 222 at the upper and lower ends thereof.

An upper end member is indicated generally by reference numeral 225 and includes a central opening 226 which is, of course, aligned with the bore through the body means 220. End member 225 is formed of a material similar to that of the previously described end members and is provided with a depending peripheral flange portion 227 having threads 228 on the inner surface thereof which are adapted to cooperate with the threads 221 at the upper outer portion of the body means for retaining the end member in operative position on the body means. A spring retaining means 229 similar to the spring retaining means 140 previously described is disposed in operative position between the upper end of the body means and the upper end member for retaining the striper device in operative position as will be well understood.

A lower end member 230 formed of material similar to the outer end members is provided with a central opening 231 for receiving the lower working end of the punch. End member 230 is also provided with an upwardly extending peripheral flange portion 233 having threads 235 formed on the inner surface thereof. Threads 235 are adapted to cooperate with the threads 222 formed on the outer lower surface of body means 220 for mounting the lower end member 230 in operative position as shown.

A radially extending threaded opening 240 is provided through the peripheral flange portion 233, and a lock screw 241 is threadedly mounted within opening 240 and is adapted to engage the outer surface of the body means for locking the lower end member in operative position and preventing it from coming loose during operation.

Referring now to the modification shown in FIGS. 12 through 14 inclusive, a punch indicated generally by reference numeral 250 is provided which may be supported from a suitable punch holder indicated at 251, punch 250 being substantially identical with the punch described in connection with FIG. 7 wherein a groove 252 is provided of the same configuration as the groove 161 as illustrated in FIG. 7. A spring retaining means indicated generally by reference numeral 254 is also substantially identical with the spring retaining means 140' as illustrated in FIG. 7.

A hard end portion indicated generally by reference numeral 256 includes a longitudinally extending peripheral flange portion 257 having a substantially cylindrical recess 258 formed therein. A body means 260 similar to the body means 112 previously described is provided, body means 260 in this particular modification having a substantially cylindrical outer surface. The body means is provided with a central bore 262 formed therethrough for receiving a punch, a counterbored portion 263 being provided at the upper end thereof for accommodating the spring retaining means.

The peripheral flange portion 257 is provided at the outer end thereof with a radially inwardly extending annular lip or bead portion 265 which is received within a circumferentially extending groove 267 provided in the outer surface of body means 260. It will be noted that the cross-sectional configuration of the lip 265 as well as the groove 267 is substantially semi-circular such that the lip is snugly received within the groove so as to securely retain the end portion 256 on the upper end of the body means.

The top wall portion 268 of end portion 256 is provided with a central opening 269 which is adapted to receive the upper portion of the punch, opening 269 being aligned with the bore 262 formed through the body means.

A second lower hard end portion indicated generally by reference numeral 270 includes a longitudinally extending peripheral flange portion 271 defining a substantially cylindrical recess 272 therewithin which receives the lower end of the body means 260 in snug relationship. The outer end of the peripheral flange portion includes a radially inwardly extending annular lip or bead 275 which is snugly received within a corresponding shaped circumferentially extending groove 276 formed in the outer surface of the body means 260. The interrelationship of lip 275 and groove 276 is identical with that discussed in connection with the end portion 256 whereby the end portion 270 is retained in fixed relationship to the lower end of the body means. Each of these end portions, as well as the end portions previously discussed in this application may be additionally secured in operative position by means of a suitable adhesive substance such as a special cement identified as Thixon–Xab–199 manufactured by Dayton Chemical Products Laboratory, West Alexandria, Ohio.

The lower wall portion 280 of the lower end portion 270 is provided with a central opening 272 formed therethrough. This form of the invention is particularly adapted for use with a punch wherein the lower or working end 250′ thereof is of a non-circular cross-sectional configuration. In the particular modification shown, this lower working end portion of the punch is illustrated as being of a substantially rectangular cross-sectional cconfiguration. Accordingly, the opening 282 provided in the end portion 270 is also of a corresponding rectangular configuration and slightly larger than the outer dimension of the working end of the punch so as to provide a slight clearance therewith.

In order to assure that the working end of the punch does not leave the opening within the lower end portion of the stripper apparatus, the end portion 270 is provided with an integral longitudinally extending portion 285 which extends upwardly a considerable distance above the lower wall portion 280 as seen in FIG. 13 thereby providing a considerably extended amount of longitudinal dimension to the opening 280 provided through this end portion. It is apparent that the longitudinally extending integral portion 285 will accommodate considerable sharpening of the working end of the punch without the possibility of the punch leaving the opening within the end portion. Accordingly, this arrangement assures that the stripper apparatus will not be inadvertently rotated with respect to the punch such that upon downward movement of the punch damage could be caused to the working end of the punch.

Referring now to the modification shown in FIGS. 15 and 16 of the drawings, a body means 290 is provided which is identical in construction with the body means 260 illustrated in FIGS. 12 through 14. Body means 290 is provided with a peripheral outer groove 291 formed therein which corresponds to the groove 276 previously described. A central bore 292 is provided through the body means which receives a punch illustrated generally by reference numeral 294 and having a lower working end portion 295 which is similar to the working portion 250′ previously described, being substantially rectangular in cross-sectional configuration.

The lower end portion in this modification is indicated generally by reference numeral 297 and includes an outer member 298 having a longitudinally extending peripheral flange portion 299 which defines a substantially cylindrical recess 300 therewithin. The upper end of the flange 299 is provided with inwardly extending annular lip or bead 302 which is received within the circumferentially extending groove 291 in the outer surface of the body means for retaining the lower end portion 297 in operative position. It will be understood that a suitable adhesive substance may also be utilized to supplement the mechanical interconnection between the lower end portion and the body means. The lower end portion 297 also includes an inner member 305 which is of substantially disk-like configuration and which includes three spaced flats 307 formed on the outer periphery thereof. Member 305 may be formed as a preblanked member while member 299 comprises a shell which in practice is drawn over member 305 thereby locking member 298 tightly in surrounding relationship to member 305. The engagement of the inner surface of the flange portion 299 of member 298 with the flats 307 positively prevents relative rotation between members 298 and 305.

Members 298 and 305 are provided with central openings 307 and 309 which are aligned with one another and cooperate to provide a central opening through the lower end portion 297, this central opening being of a substantially rectangular configuration so as to be complementary to the lower working end portion of the punch and providing a slight clearance therewith. It will be apparent that the additional thickness provided by member 305 within member 298 serves to substantially add to the longitudinal dimension of the central opening provided in the lower end portion of the stripper apparatus thereby ensuring that the working end of the punch will not leave this opening even after it has been sharpened a number of times, and further, thereby ensuring that the stripper apparatus cannot rotate with respect to the punch so as to cause the working end of the punch to be misaligned with the opening in the lower end portion of the stripper apparatus would of course result in damage to the working end of the punch.

It is apparent that when it is desired to assemble any of the end portions shown in FIGS. 12 through 16 inclusive on the respective body means, it is merely necessary to push the end portions onto the associated end of the body means until the inwardly extending lips on the end portions snap into place within the circumferential grooves in the body means.

It is apparent from the foregoing that there is provided a new and novel punch stripper apparatus which is particularly adapted for stripping work off of punches as employed in piercing, perforating, and notching operations. In each case, the stripper device may be quickly and easily mounted in operative position and is securely retained in its proper position during operation of the apparatus.

In addition, certain modifications of the invention provide an arrangement wherein the lower end member or stripper face of the stripper device may be removed and replaced as desired. The punch stripper apparatus of the present invention affords a much longer useful life than prior art arrangements, and the construction of the present invention is quite simple and compact, and yet at the same time the apparatus is quite sturdy and effective in use.

Novel means as provided for securing the end portions in place on the elastic body means of the present invention, and in the modification shown in FIGS. 12 through 16 inclusive, the end portions can be forced into place and snapped into operative position.

In addition, the modification shown in FIGS. 12 through 16 inclusive provide an arrangement which prevents misalignment of the punch with respect to the stripper apparatus which is of particular utility when the lower working end of the punch is of non-circular cross-sectional configuration as is the corresponding opening formed in the lower end portion of the stripper apparatus and which receives the working end of the punch with slight clearance. In this manner, damage to the working end of the punch is prevented during operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Punch stripper apparatus comprising an unconfined solid continuous substantially cylindrical body means formed of elastic material, said body means having a bore formed longitudinally therethrough for receiving a punch, and separate inwardly extending means supported by said apparatus adjacent said body means for engaging a portion of a punch to provide the sole means for supporting said body means in operative position in surrounding relationship to a punch.

2. Punch stripper apparatus comprising an unconfined solid continuous and generally cylindrical body means formed of elastic material and having a bore extending longitudinally through the central portion thereof, and separate means supported by said apparatus adjacent said body means and having an inwardly extending portion for engaging a portion of a punch for providing the sole means for supporting the body means in position on the punch with the punch extending through said bore.

3. Punch stripper apparatus comprising a solid continuous substantially cylindrical body means formed of elastic material and having a bore formed therethrough for receiving a punch, a first hard end portion secured to one end of said body means, a second hard end portion spaced a substantial distance from said first hard end portion and secured to the opposite end of said body means, said body means being completely unconfined and free to expand outwardly between said hard end portions, each of said end portions having a hole formed through the central portion thereof for receiving a punch, and separate means supported by said apparatus adjacent said body means and extending inwardly thereof for engaging a portion of a punch to provide the sole means for supporting the body means in operative position in surrounding relation to a punch.

4. Apparatus as defined in claim 3, wherein each of said end portions includes a recess formed in one side thereof, one end portion of said body means being received in each of said recesses, at least one of said end portions being mounted for ready attachment and removal from said body means.

5. Punch stripper apparatus comprising a body means formed of elastic material and having a bore formed therethrough for receiving a punch, the opposite end portions of the outer surface of said body means being flared outwardly toward the ends thereof, first and second end members, each of said end members having peripheral flange portions defining recesses in one surface thereof, the inner surface of said peripheral flange having tapered walls complementary to the flared end portions of said body means for snugly receiving the end portions of the body means to retain the end members in place at opposite ends of said body means, each of said end members having holes formed therethrough in alignment with the bore through said body means for receiving a punch, and means supported adjacent said body means for retaining said body means in operative surrounding relationship to a punch.

6. Apparatus as defined in claim 5, wherein said retaining means comprises resilient spring means in the form of a split ring of generally annular configuration including spaced inwardly directed resilient portions adapted to engage a portion of a punch.

7. Apparatus as defined in claim 5, wherein said retaining means comprises a set screw, one of said end members having a radially extending threaded opening formed therein, said set screw being mounted within said threaded opening.

8. Punch stripper apparatus comprising body means formed of elastic material and having a bore extending therethrough for receiving a punch, first and second hard end members, each of said end members having a peripheral flange portion extending therefrom and defining a recess for receiving an end of said body means, each of said end members being operatively connected with one end portion of said main body means, the end portions of said body means being snugly received within the recesses of said end members, each of said end members having a central opening formed therethrough for receiving a portion of a punch, and resilient means for retaining the body means in operative position about a punch, said resilient means comprising a generally annular split ring having spaced portions thereof extending inwardly for engaging a punch, said resilient means being movably mounted between said first end member and one end of said body means.

9. Apparatus as defined in claim 8, wherein said resilient means has an outer diameter less than the inner diameter of the recess of said first end member whereby said resilient means is allowed free expansion and contraction movements.

10. Apparatus as defined in claim 8, wherein said resilient means includes a flat annular portion and a plurality of arm portions which extend inwardly and out of the plane of said annular portion, said first end member having a plurality of longitudinally extending slots formed therein for receiving said arm portions.

11. Apparatus as defined in claim 8, wherein said resilient means includes a flat annular portion and a plurality of arm portions which extend inwardly and out of the plane of said annular portion, said body means being counterbored to provide an annular recess for receiving said arm portions.

12. Punch stripper apparatus comprising a solid continuous substantially cylindrical body means formed of elastic material and having a bore extending therethrough for receiving a punch, first and second hard end members spaced a substantial distance from one another, each of said end members defining a recess in one surface thereof, one end portion of said main body means being snugly received within the recess of each of said end members whereby said end members are attached to opposite ends of said body means, said body means being completely unconfined and free to expand outwardly between said hard end members, each of said end members having a hole formed therethrough in alignment with the bore in said body means for receiving a punch, one of said end members including a radially extending opening formed therein, said opening being threaded, and threaded means mounted within said opening and extending radially inwardly for engaging a punch to provide the sole means for supporting the body means in operative position in surrounding relationship to a punch.

13. Punch stripper apparatus comprising a solid continuous substantially cylindrical body means formed of elastic material and having a bore formed therethrough for receiving a punch, a pair of hard end portions, each of said end portions having a recess formed in one surface thereof for receiving an end portion of said body means, said end portions being spaced a substantial distance from one another, said body means being completely unconfined and free to expand outwardly between said hard end portions, means mounted adjacent one of said end portions and including inwardly extending portions for engaging a punch to provide the sole means for supporting said body means in operative position in surrounding relationship to a punch, the other of said end portions being selectively removable from said body means.

14. Punch stripper apparatus comprising in combination, a generally cylindrical punch portion having a circumferentially extending groove formed in the outer surface thereof, a stripper device comprising a solid continuous substantially cylindrical body means formed of elastic material and having a bore extending therethrough, said bore receiving said punch, first and second hard end members mounted at opposite ends of said body means and being spaced a substantial distance from one another, said body means being completely unconfined and free to expand outwardly between said hard end members, said end members having holes formed therethrough in alignment with said bore for receiving said punch, and means mounted in said stripper device adjacent said body means and including inwardly extending portions received within said groove to provide the sole means for supporting the stripper device in operative surrounding relationship to said punch.

15. Punch stripper apparatus comprising a body means formed of elastic material and having a bore formed therethrough for receiving a punch, a pair of end members, each of said end members having a peripheral flange portion extending longitudinally thereof and defining a recess in one surface thereof to receive an end portion of said body means, each of said end members having a central opening formed therethrough for receiving a punch, each of said members being mounted on one end of said body means with the corresponding end of the body means positioned within the recess of the associated end member, each of said end members having formed thereon an inwardly extending lip portion formed annularly therearound, said body means having a pair of annular grooves formed in the outer surface thereof, each of said lip portions being received in one of said annular grooves for retaining said end members in operative position, and means supported adjacent one of said end members and including an inwardly extending portions for engaging a punch to retain the body means in operative position in surrounding relation to the punch.

16. Punch stripper apparatus comprising a body means formed of elastic material and having a bore formed therethrough for receiving a punch, a pair of hard end portions, each of said end portions having a peripheral flange portion extending longitudinally thereof and defining a recess in one surface thereof to receive an end portion of said body means, each of said end portions having a central opening formed therethrough for receiving a punch, each of said end portions being mounted on one end of said body means with the corresponding end of the body means positioned within the recess of the associated end portion, the outer end portion of said peripheral flange portion having formed thereon an inwardly projecting annular lip portion, said body means having a substantially cylindrical outer surface, each of said recesses defined by said end portions being substantially cylindrical so as to snugly receive the outer end portions of said body means, said body means having formed on the outer surface thereof a pair of circumferentially extending grooves, each of said grooves receiving one of said lip portions on one of the end portions for securely retaining the end portions in operative position, and means supported adjacent one of said end portions and including an inwardly extending portion for engaging a punch to retain the body means in operative position in surrounding relation to the punch.

17. Punch stripper apparatus comprising a solid continuous substantially cylindrical body means formed of elastic material and having a bore formed therethrough for receiving a punch, a pair of hard end portions, each of said end portions being secured to one end of said body means and being spaced a substantial distance from one another, said body means being completely unconfined and free to expand outwardly between said hard end portions, each of said end portions having a central opening formed therethrough in alignment with the bore formed in said body means and being adapted to receive a portion of a punch, the opening in one of said end portions being of non-circular configuration and adapted to receive the working end of a punch, said non-circular opening being of less dimension than said bore in said body means, said end portion having said non-circular opening formed therein including a thickened portion of greater thickness than remaining portions of said end portion adjacent to and surrounding said non-circular opening so as to prevent misalignment of said end portion with respect to the working end of the punch, and means supported adjacent one of said end portions and including an inwardly extending portion for engaging a punch to provide the sole means for supporting the body means in operative position in surrounding relation to the punch.

18. Punch stripper apparatus comprising a body means formed of elastic material and having a bore formed therethrough for receiving a punch, a pair of hard end portions, each of said end portions having a peripheral flange portion extending longitudinally thereof and defining a recess in one surface thereof to receive an end portion of said body means, each of said end portions having a central opening formed therethrough for receiving a punch, each of said end portions being mounted on one end of said body means with the corresponding end of the body means positioned within the recess of the associated end portion, each of said end portions having formed at the outer end of the peripheral flange thereof an annular radially inwardly extending lip, said body means having a pair of spaced circumferentially extending grooves formed therein, each of said lips being received in one of said grooves for retaining the end portions in operative position at opposite ends of said body means, one of said end portions having a non-circular opening formed therethrough for receiving the working end of said punch having a correspondingly shaped working end, said last-mentioned end portion including means providing an opening therethrough of substantial length for preventing the working end of the punch from passing upwardly out of the opening in said last-mentioned end portion and thereby preventing the possibility of misalignment of the punch with respect to the stripper appartus, and means supported adjacent one of said end portions and including an inwardly extending portion for engaging a punch to retain the body means in operative position in surrounding relation to the punch.

19. Punch stripper apparatus comprising a solid continuous substantially cylindrical body means formed of elastic material and having a bore formed therethrough for receiving a punch, a pair of hard end portions, said end portions being secured to opposite ends of said body means and spaced a substantial distance from one another, said body means being completely unconfined and free to expand outwardly between said hard end portions, each of said end portions having a central opening formed therethrough in alignment with the bore of said body means and being adapted to receive a portion of a punch, one of said end portions including a central longitudinally extending portion through which the opening is formed, said opening being of non-circular configuration, whereby misalignment is prevented between the stripper apparatus and the associated punch having a working end portion of non-circular cross-sectional configuration corresponding to the configuration of said non-circular opening in said end portion, and means supported adjacent one of said end portions and including an inwardly extending portion for engaging a punch to provide the sole means for supporting the body means in operative position in surrounding relation to the punch.

20. Punch stripper apparatus comprising a body means formed of elastic material and having a bore formed therethrough for receiving a punch, a pair of hard end portions, each of said end portions being fixed to one end portion of said body means, each of said end portions having a central opening formed therethrough for receiving a punch, said openings being aligned with the bore formed through said body means, one of said end portions having a non-circular opening fromed therethrough and including an outer member having a peripheral flange portion extending longitudinally thereof and defining a recess in one surface thereof for receiving an end portion of said body means, said one end portion also including an inner member disposed therewithin at the bottom of the recess of said outer member to provide additional thickness in surrounding relationship to said opening formed through the end portion, said opening in said one end portion being formed through the central portion of said inner and outer members and means for preventing relative rotation between said inner and outer members, and means supported adjacent one of said end portions and including an inwardly extending portion of engaging a punch to retain the body means in operative position in surrounding relation to the punch.

21. Apparatus as defined in claim 20 wherein said means for preventing relative rotation between said inner and outer members comprises at least one flat formed on the outer periphery of said inner member, the inner wall of the recess of said outer member being in contact with said flat so as to prevent any relative rotation between said inner and outer members.

22. Punch stripper apparatus comprising a body means formed of elastic material and having a bore formed therethrough for receiving a punch, a pair of hard end plates, each of said end plates having a peripheral flange portion extending longitudinally thereof and defining a recess in one surface thereof to receive an end portion of said body means, each of said end plates having a central opening formed therethrough for receiving a punch, each of said end plates being mounted on one end of said body means with the corresponding end of the body means positioned within the recess of the associated plate, and means supported adjacent one of said plates and including an inwardly extending portion for engaging a punch to retain the body means in operative position in surrounding relation to the punch, at least one of said end plates being threadedly attached to the corresponding end of said body means.

23. Punch stripper apparatus comprising a body means formed of elastic material and having a bore formed therethrough for receiving a punch, a pair of hard end portions, each of said end portions having a recess formed in one surface thereof for receiving an end portion of said body means, means mounted adjacent one of said end portions and including inwardly extending portions for engaging a punch for retaining said body means in operative position in surrounding relationship to a punch, the other of said end portions being selectively removable from said body means, a tubular member embedded in the material of said body means and extending radially thereof and opening through the outer surface thereof, said other end portion having radially extending holes formed therethrough, and means extending through said last-mentioned holes and into said tubular member for retaining said other end portion in operative position at one end of said body means.

24. Punch stripper apparatus comprising a body means formed of elastic material and having a bore formed therethrough for receiving a punch, a pair of hard end portions, each of said end portions having a recess formed in one surface thereof for receiving an end portion of said body means, means mounted adjacent one of said end portions and including inwardly extending portions for engaging a punch for retaining said body means in operative position in surrounding relationship to a punch, the other of said end portions being selectively removable from said body means, said other end portion being threadedly mounted on the associated end of said body means, and means for retaining said other end portion in operative position.

25. Apparatus as defined in claim 24 wherein said first-mentioned one end portion is also threadedly mounted on the associated end portion of said body means.

References Cited by the Examiner

UNITED STATES PATENTS

| | | | |
|---|---|---|---|
| 928,256 | 7/09 | Grissom | 83—139 |
| 2,225,342 | 12/40 | Hyatt | 83—136 |
| 2,230,043 | 1/41 | Moran | 83—138 |
| 2,867,276 | 1/59 | Taylor | 83—139 |

WILLIAM W. DYER, JR., *Primary Examiner.*

WILLIAM S. LAWSON, *Examiner.*